(12) United States Patent
Spector et al.

(10) Patent No.: US 12,542,774 B2
(45) Date of Patent: Feb. 3, 2026

(54) SYSTEMS AND METHODS FOR RESTRICTED RESOURCE ACCESS MANAGEMENT

(71) Applicant: JPMORGAN CHASE BANK, N.A., New York, NY (US)

(72) Inventors: Howard Spector, Street, MD (US); Brian J. Smyth, West Chester, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 155 days.

(21) Appl. No.: 18/605,351

(22) Filed: Mar. 14, 2024

(65) Prior Publication Data

US 2024/0314116 A1 Sep. 19, 2024

Related U.S. Application Data

(60) Provisional application No. 63/490,421, filed on Mar. 15, 2023.

(51) Int. Cl.
*H04L 9/40* (2022.01)
*G07C 9/21* (2020.01)

(52) U.S. Cl.
CPC .............. *H04L 63/083* (2013.01); *G07C 9/21* (2020.01)

(58) Field of Classification Search
CPC ............ H04L 63/083; H04L 9/32; G07C 9/21
See application file for complete search history.

(56) References Cited

U.S. PATENT DOCUMENTS

| | | | |
|---|---|---|---|
| 8,577,334 B1 * | 11/2013 | Smith | H04W 12/37 455/412.2 |
| 9,183,361 B2 * | 11/2015 | Obasanjo | H04L 63/0807 |
| 9,985,786 B1 | 5/2018 | Bhabbur et al. | |

(Continued)

FOREIGN PATENT DOCUMENTS

GB 2461963 1/2010

OTHER PUBLICATIONS

International Search Report and Written Opinion of the International Searching Authority, dated Jul. 3, 2024, from corresponding International Application No. PCT/US2024/020181.

*Primary Examiner* — Khalid M Almaghayreh
(74) *Attorney, Agent, or Firm* — GREENBERG TRAURIG LLP

(57) ABSTRACT

Systems and methods for restricted resource access management are disclosed. A method may include: a user application executed by a user electronic device receiving a request for access to a restricted resource, generating a machine-readable code comprising a unique identifier and a uniform resource locator, communicating the machine-readable code to a backend computer program, and presenting the machine-readable code to an access device for the restricted resource. The access device may communicate the machine-readable code to the backend computer program using the uniform resource locator. The backend computer program may compare the machine-readable code received from the user application to the machine-readable code received from the access device, and may send a control signal to the access device to grant access in response to a match. The access device may grant access to the restricted resource in response to receiving the first control signal.

11 Claims, 4 Drawing Sheets

(56) References Cited

U.S. PATENT DOCUMENTS

| | | | | |
|---|---|---|---|---|
| 11,516,665 | B2* | 11/2022 | Kamkar | H04L 63/10 |
| 11,631,085 | B2* | 4/2023 | Jurss | G06Q 20/1085 |
| | | | | 705/67 |
| 11,734,442 | B2* | 8/2023 | Levin | G06F 21/44 |
| | | | | 726/30 |
| 2013/0067568 | A1* | 3/2013 | Obasanjo | G06F 21/31 |
| | | | | 726/20 |
| 2015/0082407 | A1* | 3/2015 | Galpin | H04L 67/60 |
| | | | | 726/9 |
| 2019/0108326 | A1* | 4/2019 | Fujimaki | G06F 21/6218 |
| 2019/0149547 | A1* | 5/2019 | Dubodelov | G06F 3/04842 |
| | | | | 726/4 |
| 2019/0230082 | A1* | 7/2019 | Cernoch | H04L 63/10 |
| 2020/0137068 | A1* | 4/2020 | Dintenfass | H04W 12/02 |
| 2021/0360403 | A1* | 11/2021 | Kamkar | H04L 63/108 |
| 2021/0400047 | A1* | 12/2021 | Gu | H04L 67/568 |
| 2022/0108573 | A1* | 4/2022 | Taylor | H04Q 1/457 |
| 2022/0360582 | A1* | 11/2022 | Tulshibagwale | H04L 63/08 |
| 2022/0400112 | A1 | 12/2022 | Cavalcanti et al. | |
| 2022/0406111 | A1* | 12/2022 | Doyon | G07C 9/00896 |
| 2023/0137835 | A1* | 5/2023 | Levin | G06F 21/73 |
| | | | | 726/30 |
| 2024/0020683 | A1* | 1/2024 | Bacon | H04L 9/50 |

* cited by examiner

SYSTEMS AND METHODS FOR RESTRICTED RESOURCE ACCESS MANAGEMENT

RELATED APPLICATIONS

This application claims priority to, and the benefit of, U.S. Provisional Patent Application Ser. No. 63/490,421, filed Mar. 15, 2023, the disclosure of which is hereby incorporated, by reference in its entirety.

BACKGROUND

1. Field of the Invention

Embodiments are generally directed to systems and methods for restricted resource access management.

2. Description of the Related Art

Some organizations offer access to premises for their customers that obtain and use specific products. Verification of qualifying products and good standing, however, is conventionally limited to visual verification by human actors, calling a payment network API, or using other services that are disconnected from the resource owner. These approaches present a poor customer experience and rely on individuals or a third party to make business decisions for the organization providing the qualifying product.

SUMMARY OF THE INVENTION

Systems and methods for restricted resource access management are disclosed. According to an embodiment, a method may include: (1) authenticating, by a user application executed by a user electronic device, a user; (2) receiving, by the user application, a request for access to a restricted resource; (3) generating, by the user application, a machine-readable code comprising a unique identifier and a uniform resource locator; (4) communicating, by the user application, the machine-readable code to a backend computer program; (5) presenting, by the user application, the machine-readable code, to an access device for the restricted resource; (6) receiving, by the access device, the machine-readable code; (7) communicating, by the access device, the machine-readable code to the backend computer program using the uniform resource locator; (8) comparing, by the backend computer program, the machine-readable code received from the user application to the machine-readable code received from the access device; (9) sending, by the backend computer program, a first control signal to the access device to grant access in response to the machine-readable code received from the user application matching the machine-readable code received from the access device; and (10) granting, by the access device, access to the restricted resource in response to receiving the first control signal.

In one embodiment, the method may also include sending, by the backend computer program, a second control signal to the access device to deny access in response to the machine-readable code received from the user application not matching the machine-readable code received from the access device, and denying, by the access device, access to the restricted resource in response to receiving the second control signal.

In one embodiment, the restricted resource comprises a physical area.

In one embodiment, the access device comprises an access restriction device. The access restriction device comprises a gate or a door.

In one embodiment, the restricted resource comprises digital content or a digital service, and the step of granting access to the restricted resource in response to receiving the first control signal comprises granting access to the digital content or the digital service to the user electronic device.

In one embodiment, the method may also include determining, by the backend computer program, that the user is eligible for the access before sending the first control signal.

According to another embodiment, a method may include: (1) receiving, by a user application executed by a user electronic device, a trained offline scan detection model and an access counter; (2) receiving, by the user application, a request for access to a restricted resource; (3) determining, by the user application, to grant access to the restricted resource based on the access counter; (4) generating, by the user application, a machine-readable code comprising a unique identifier and a uniform resource locator; (5) presenting, by the user application, the machine-readable code to an access device; (6) identifying, by the user application, scanning activity by the access device; (7) determining, by the user application using the scan detection model, that the user electronic device is being scanned by the access device; (8) communicating, by the user application, a first control signal to the access device granting access to the restricted resource; and (9) granting, by the access device, access to the restricted resource in response to receiving the first control signal.

In one embodiment, the trained offline scan detection model is trained with images of electronic devices being scanned.

In one embodiment, the access counter identifies a number of accesses remaining.

In one embodiment, the restricted resource comprises a physical area.

In one embodiment, the access device comprises an access restriction device. The access restriction device comprises a gate or a door.

In one embodiment, the restricted resource comprises digital content or a digital service, and the step of granting access to the restricted resource in response to receiving the first control signal comprises granting access to the digital content or the digital service to the user electronic device.

In one embodiment, the method may also include receiving, by the user application, a code in a Service Set Identifier (SSID) broadcast by a beacon near the restricted resource, and increasing, by the user application, the access counter in response to the code.

According to another embodiment, a system may include: an access device associated with a restricted resource; a user electronic device executing a user application; and a backend in communication with the user application and the user electronic device executing a backend computer program. The user application is configured to receive a request for access to the restricted resource from a user; the user application is configured to generate a machine-readable code comprising a unique identifier and a uniform resource locator; the user application is configured to communicate the machine-readable code to the backend computer program; the user application is configured to present the machine-readable code, to an access device for the restricted resource; the access device is configured to receive the machine-readable code; the access device is configured to communicate the machine-readable code to the backend computer program using the uniform resource locator; the backend computer program is configured to compare the machine-readable code received from the user application to the machine-readable code received from the access device; the backend computer program is configured to send a first control signal to the access device to grant access in response to the machine-readable code received from the user application matching the machine-readable code received from the access device; and the access device is configured to grant access to the restricted resource in response to receiving the first control signal.

In one embodiment, the backend computer program is further configured to send a second control signal to the access device to deny access in response to the machine-readable code received from the user application not matching the machine-readable code received from the access device; and the access device is further configured to deny access to the restricted resource in response to receiving the second control signal.

In one embodiment, the restricted resource comprises a physical area.

In one embodiment, the access device comprises an access restriction device comprising a gate or a door.

In one embodiment, the restricted resource comprises digital content or a digital service, and the access device is further configured to grant access to the digital content or the digital service to the user electronic device.

According to another embodiment, a method may include: (1) authenticating to a provider's backend services from a mobile electronic device; retrieving a customer's account details; (2) generating a Quick Response (QR) code containing an embedded URL with a UUID and other authenticating/verification data; (3) displaying the QR code on the mobile device; (4) sending the UUID to a public store for future matching; (5) scanning the QR code with a scanner of an onsite premises system; sending the UUID to the provider's backend services; validating the UUID; and (6) returning an access parameter to the onsite premises system.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
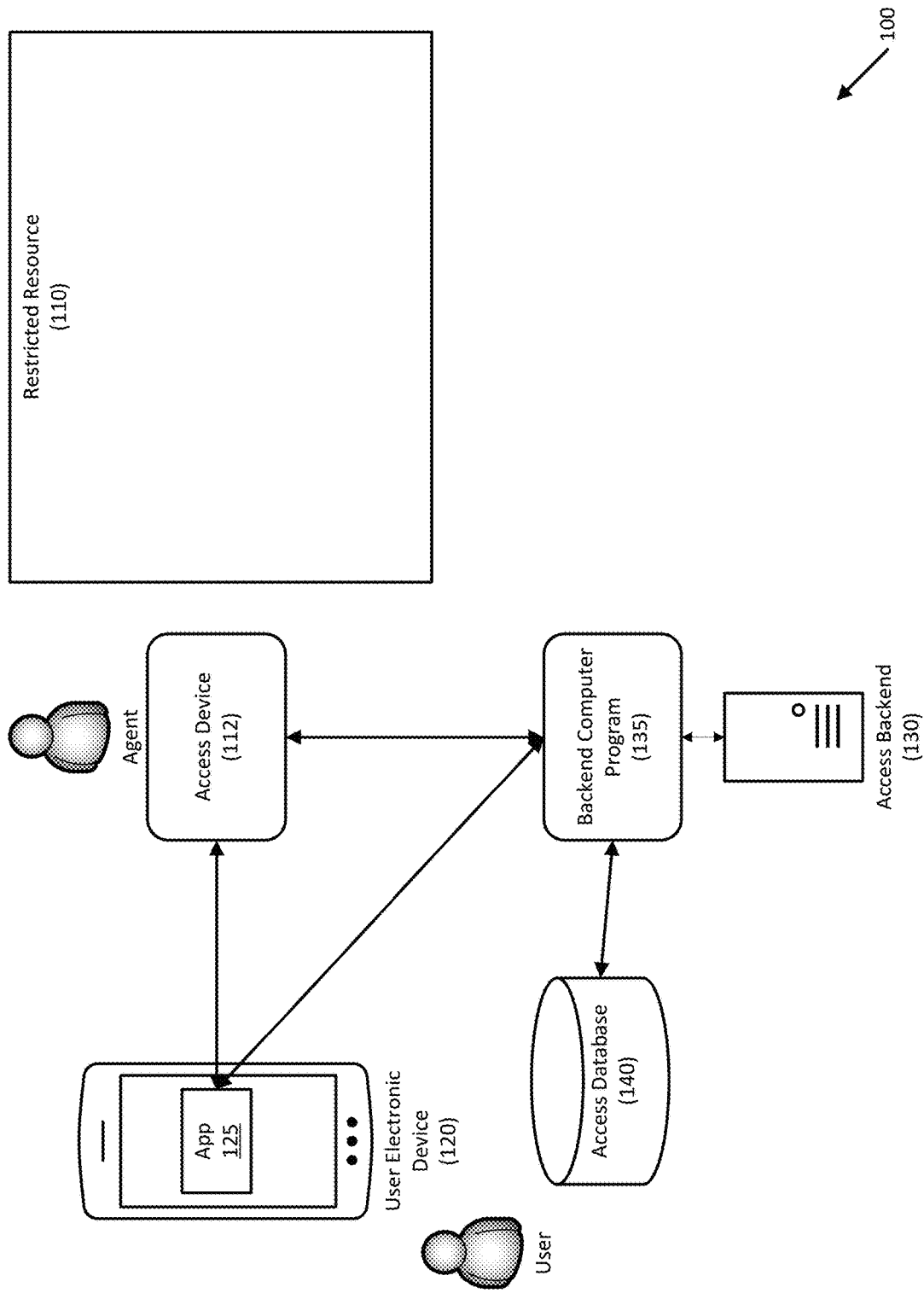
FIG. 1 depicts a system for restricted resource access management according to an embodiment.

Embodiments generally relate to systems and methods for restricted resource access management.

According to an embodiment, an organization may grant access to a restricted resource, such as a restricted area or a restricted service, based on a customer's procurement of a certain product. In one embodiment, a payment product issuer (e.g., an issuer of payment cards/accounts such as credit cards and debit cards or other financial products) may grant access to lounges (e.g., airport lounges), restaurants, fitness facilities, hotel rooms, restricted areas of partnering organizations, etc., for customers that procure and utilize one or more of the issuing organization's products. A providing organization may additionally authorize particular services for holders of a particular product of the providing organization. For instance, free or discounted food or beverages at partnering organizations' facilities or on flights of partnering airlines.

Embodiments described herein simplify the customer and agent experience, while at the same time closing gaps in the existing approaches. In accordance with embodiments, a customer of a providing organization may use a mobile device and a mobile browser to log into a providing organization's website, or may access and log into the providing organization's mobile application executing on the device to retrieve a code, such as a QR Code. The retrieved QR code may include parameters that can be electronically verified to allow access to the provider's premium offers and premises. Embodiments may be supported through the use of Bluetooth Low Energy (BLE), mobile operating system (OS) wallets, direct near-field communication protocol (NFC), or a printed QR code.

Embodiments may also support offline validation. A QR code or other validation instrument may be signed so the content can be validated locally (e.g., on a mobile device that does not have access to internet communications or otherwise may not be in operative communication with the provider's backend systems. In embodiments, an end-date and other status information may be provided to allow for a decision to be made locally on a mobile device. A partnering organization may later send a file or real-time event to mark entry and support auditing and reporting. Offline validation may also be made into a touchless experience using geofencing and BLE to transmit the signed code to the onsite premises system such that the customer does not even have to remove the device from their pocket, briefcase, etc.

In one embodiment, a shared secret may be used to validate a hash contained within the payload of the machine-readable code by taking a predefined set of fields and the secret and hashing the values. This secret may rotate automatically using time based or similar mechanisms, or it may be a random value that may be shared with the owner or controller of access to the restricted resource.

Both online and offline validation may be enhanced to allow for the display of a photo of the customer on the onsite premises system. The photo may be retrieved from the provider's access system based on the code/parameters supplied by the QR or other method. Additionally, reporting and audit features, and any finance reconciliation may be enabled. These features may be difficult or impossible to track directly using a payment network API or other non-provider-controlled method.

An onsite premises system, in addition to validating provided parameters, may store them locally for use in an offline mode of validation. Validation rules may be hard coded or delivered via a batch or API call to the provider backend system. In addition, based on current usage patterns detected by geo-fencing, collected data, or partnering organizations' data, a providing organization may push or pull access from customers who are at or arriving at the special-access location. This may leverage analytics and machine learning and may use cross-company data to provide optimum offer decisions).

In accordance with embodiments, the techniques described herein, in addition to lounge access, may be used for access to rental cars, hotel rooms, dining benefits or even digital items like access to advanced features in rented vehicles, special playlists or movies/shows, etc. For example, machine learning (ML) may be used in conjunction with collected data and partner data to provide real-time access or benefits to a customer based on the customer's location. In an exemplary embodiment, a customer enjoying a vacation may receive details and a QR code for free or discounted access to a show or other entertainment service based on the customer's location in proximity to the location of the entertainment service.

An exemplary flow for access management may include the following. A customer may be authenticated to a provider's backend services from a mobile electronic device. The customer's account details may be retrieved and displayed in the mobile electronic device. The customer may click on an icon, such as an "Access" icon within mobile webpage or application. A code, such as a QR code (which may contain a URL with a UUID (universally unique identifier) or other unique ID), may be generated and displayed on a display of the mobile device. The UUID or other unique ID may be sent to a public store for future matching. A configurable timeout may also be sent.

In accordance with embodiments, exemplary QR code contents may include: a unique code or UUID, such as a unique one time or limited time use identifier that provides access; a public URL with the UUID or other identifier affixed as a parameter and that can be called publicly to validate access; and a valid time/date that specifies how long the QR code is valid. In online scenarios, the values can be checked and marked as used. In offline scenarios (discussed in more detail herein) other considerations may be considered.

Continuing with the exemplary flow, an onsite premises system, which may include a kiosk or a handheld device including an optical scanner, may scan the QR code displayed on the mobile device and may send the unique code as a parameter of the embedded URL to the provider backend system for validation. Since this is not a sensitive call it can be publicly available making integration simple. The provider backend system may validate the unique code passed via the URL and return an access or deny parameter to the onsite premises system. An audit trail of which unique codes where allowed access may be stored. If an access parameter is returned, the onsite premises system may allow access or an agent (e.g., that scanned the QR code with a handheld device) may manually provide access. In an offline scenario, a file feed or real-time events may be later sent to the provider backend to confirm access being granted.

In accordance with embodiments, access may be facilitated where a customer's or partner's mobile devices are "offline" (e.g., no access to mobile networks, Wi-Fi networks and/or the internet). Embodiments may address enforcement of access rules or access quantity (e.g., a number of visits, an amount of time visits may last, etc.).

In accordance with embodiments, a customer's mobile electronic device may contain local data (optionally encrypted) that may be used to decision an access request. Based on a number of accesses, points, dollar value, location and/or other factors (e.g., BLE beacons, distance traveled, etc.) the application may display a QR code and use an offline process to make an offline access decision/update.

In accordance with embodiments, an exemplary flow for access management in an offline scenario is as follows. A customer may access a provider's mobile application. In an offline scenario, the application may provide and use internal counters. The counters may be updated/current from a last online update or may be maintained/updated via offline ML-triggered updates to determine if access should be granted. Exemplary ML-triggered updates to counters include a ML algorithm configured to evaluate images captured by the customer's mobile device and determine when a scan of a displayed QR code has taken place. The provider mobile application may be configured to control a digital camera of the mobile device and capture images in the direction of the displayed QR code while the QR code is displayed on the device. The ML algorithm may be trained to recognize scanning devices, a laser or LCD scanning light beam from scanning devices, or any acceptable image-based identification of a scan of the displayed QR code. In embodiments, BLE or NFC may be used to detect a scanner/scan. Additionally, a custom Wi-Fi Service Set Identifier (SSID) may be utilized including a unique code. The Wi-Fi SSID may contain a hash as the name the device would see and update its internal count. BLE may work in a similar fashion but not be as persistently available.

In accordance with an embodiment, the contents of the QR (or NFC or BLE) communication may be hashed (e.g., with a one-way function, hashing algorithm, etc.). The hash may be "salted" with a shared secret that is shared with the provider or may incorporate another suitable technique to allow validation by the service provider in an offline scenario.

Continuing with the exemplary offline flow, the image data may be sent to the local ML algorithm/model on the customer's mobile electric device and a determination as to whether a scan has been made. If it is determined that a scan has been made, the internal counter can be incremented, and if the counter's updated value indicates that the customer has access instances available, access may be granted. When the device(es) are online again, access logs may be sent to the provider backend for auditing, billing, etc., and may also be used to train the ML scan detection model to enhance the model's predictive ability. Additionally, the captured images and decisions may be sent as training data for the ML model. The ML model may be continually retrained on the provider's backend system and fresh versions of the model may be pushed to the mobile application/device as they are approved for production offline use.

In another embodiment, a QR code may be displayed by an onsite premises system (e.g., a kiosk or a handheld device used by a lounge agent). The QR code may be scanned by the provider's mobile application executed on the customer's device (e.g., using the device's camera). The mobile application may then provide a code that the agent can enter or even generate a second QR to be scanned by the agent (sometimes referred to as a QR swapping routine). Such an offline flow facilitates direct involvement of the customer's device as opposed to embodiments where the device attempts to detect the scan.

Offline flows may include the customer's device providing a location value for the number of accesses and when those accesses expire and/or an independent token stored for each potential access. An onsite premises system in the described offline flows will only allow the ID or the Token to be used a set number of times. The number of times, however, may be configurable based on varying criteria (e.g., for long-time customers, customers that use the product over a set number of times, or other customers perceived as valuable based on some usage pattern, the number of times may be relatively higher, or even unlimited).

In accordance with embodiments, techniques described herein may be used or modified to grant access to virtual premises, collections of restaurants, bars and stores at, e.g., an airport, and other places.

For instance, techniques may be used to facilitate access to services while in flight. Customers of a provider may be granted access to perks/services while traveling. Examples include access to free/discounted WIFI, texting, newer movie titles, drinks or off-menu drinks, or other benefits. The offline flows described herein may be leveraged to provide such benefits. Providers may have a presence (a virtual premises) in a virtual or augmented reality environment (e.g., the "metaverse"). Accordingly, access may be granted using the techniques described herein. Moreover, online memberships or digital items that need to be unlocked as a part of physical experience may also employ aspects and features described herein. Access to special content on a customer's device may be granted (e.g., while the customer is waiting for a flight, etc.). The described techniques may be used to extend access to stores and restaurants. Techniques described herein may be applied at hotels and other establishments to provide access to benefits or services offered at these locations. Embodiments may be also used to upgrade customers' rental car experiences.

The disclosed techniques may also be used to provide access to a hotel or similar private space by allowing the QR/NFC or BLE generated token or other information to be shared with the provider. This allows customers to gain access to the space without providing or obtaining a physical key card or using the special venue specific application. The disclosed techniques may be used across a broad range of scenarios where access management is required, including (but not limited to) park access, line-jumping access for rides, concerts, events, and other entertainment, etc.

Referring to FIG. 1, a system for access management is provided according to an embodiment. System 100 may include restricted resource 110, which may be a lounge (e.g., airport lounges), a restaurant, a fitness facility, a hotel room, a restricted area, etc. Restricted resource 110 may be provided with access device 112, which may include an optical scanner (e.g., a digital camera), microphone, keypad, etc. Access device 112 may be implemented in a kiosk or may be a portable device operated by an agent. Access device 112 may interface with backend computer program 135, which may be executed by access backend 130. Backend computer program 135 may decision access to restricted resource 110 for a user.

In one embodiment, while restricted resource 110 may be described herein as a physical area, it should be noted that restricted resource 110 may include restricted services, such as access to computer services (e.g., free or discounted WiFi, access to digital content, etc.), seat upgrades, free or discounted food or beverage, etc.

The user may carry user electronic device 120, which may be a mobile electronic device such as a notebook computer, laptop computer, smartphone, smart watch, Internet of Things (IoT) appliance, a smart card, etc. User electronic device 120 may execute application ("app") 125, which may be provided by an entity that may sponsor access to restricted resource 110. An example of such an entity may be a financial institution sponsoring access to an airport lounge for certain card holders.

Application 125 may authenticate the user using, for example, a username and password, a biometric, etc. and, as requested, may generate a code to present to access device 112. The code may be an optical code, such as a QR code, bar code, etc., may be an alphanumeric code, may be a RF code, etc. The code may include a unique identifier and may also include a URL for code verification via backend computer program 135.

Application 125 may also communicate the code to backend computer program 135. The code may be communicated with an expiration period (e.g., 15 minutes, 1 hour, 1 day, etc.).

When access device 112 receives the code, it may provide the code to backend computer program 135, which may determine if the code is valid. If it is, backend computer program 135 may send a signal to access device 112 granting access to restricted resource 110. If the code is not valid, or has expired, backend computer program 135 may send a signal to access device 112 denying access to restricted resource 110.

If a gate, door, or similar mechanism is provided for restricted resource 110, the signal may cause the gate to open, the door to unlock, etc.

Backend computer program 135 may store a record of access grants and denials to access database 140. This may be used, for example, for auditing.

In an offline mode, application 125 may use one or more counters in the decisioning process. The counters may be updated/current from a last online update or may be maintained/updated via offline ML-triggered updates to determine if access should be granted. Exemplary ML-triggered updates to counters include a ML algorithm configured to evaluate images captured by the customer's mobile device and determine when a scan of a displayed QR code has taken place.

Application 125 may also control its digital camera to recognize scanning devices, a laser or LCD scanning light beam from scanning devices, or any acceptable image-based identification of a scan of the displayed QR code. In other embodiments, BLE or NFC may be used to detect a scanner/scan. Additionally, a custom Wi-Fi SSID (service set identifier) may be utilized including a unique code. The Wi-Fi SSID may contain a hash as the name the device would see and update its internal count. BLE may also be used.

In accordance with embodiments, the contents of the QR (or NFC or BLE) communication may be hashed (e.g., with a one-way function, hashing algorithm, etc.). The hash may be "salted" with a shared secret that is shared with backend computer program 135 or may incorporate another suitable technique to allow validation by backend computer program 135 in an offline scenario.

Application 125 may send image data to a ML algorithm/model on user electronic device 120 to determine whether access device 112 has scanned or imaged user electronic device 120. If the ML algorithm/model determines that a scan has been made, the internal counter may be incremented, and if the counter's updated value indicates that the customer has access instances available, access may be granted. When user electronic device 120 and access device 112 are online again, access logs may be sent to backend computer program 135 for auditing, billing, etc., and may also be used to train the ML scan detection model to enhance the model's predictive ability. Additionally, the captured images and decisions may be sent to as training data for the ML model. The ML model may be continually retrained by backend computer program 135 and fresh versions of the model may be pushed to the mobile application/device as they are approved for production offline use.

Figure 2:
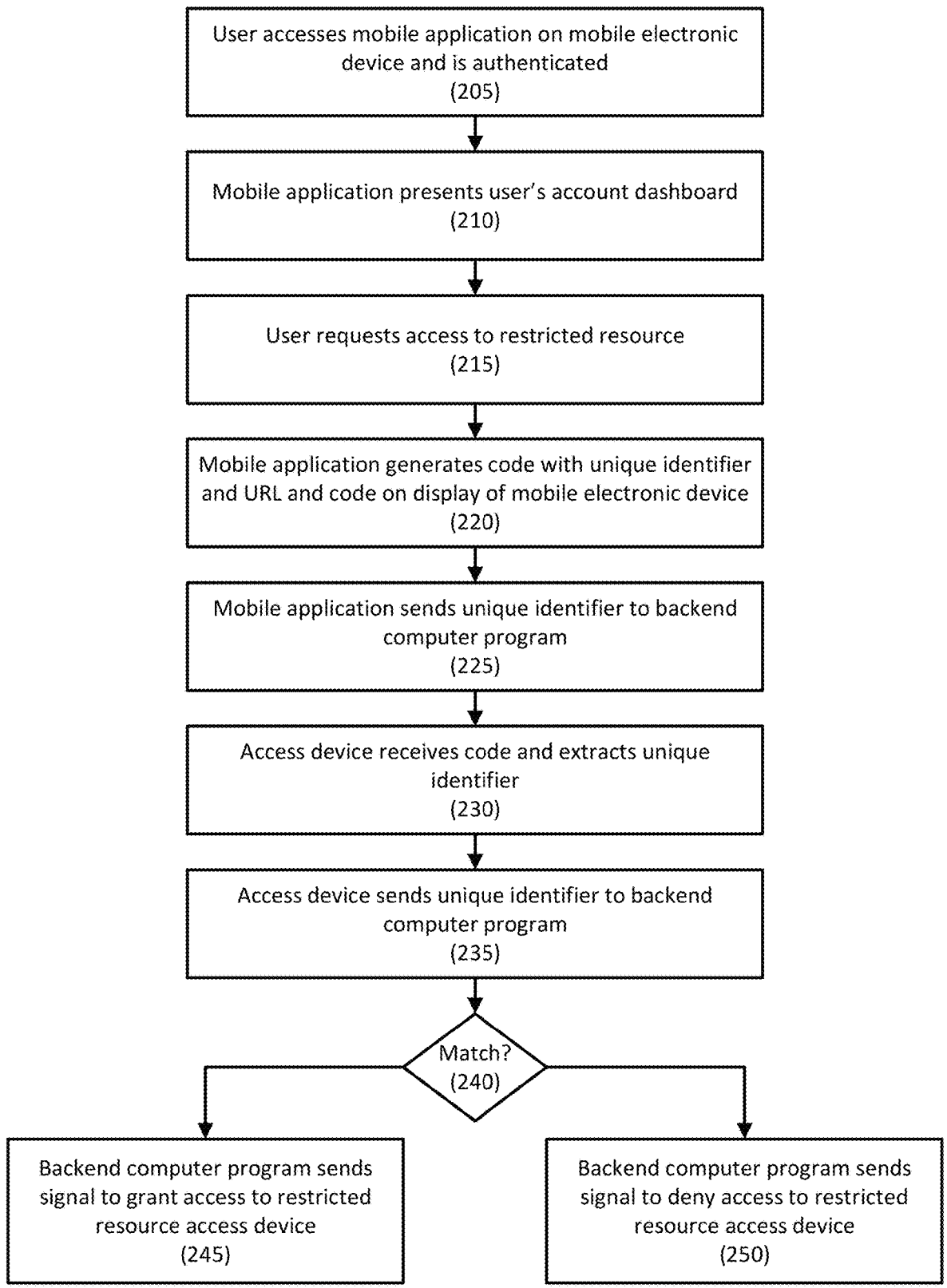
FIG. 2 depicts a method for restricted resource access management according to an embodiment.

Referring to FIG. 2, a method for access management is provided according to an embodiment.

In step 205, a user may access a mobile application on the user's mobile electronic device and may be authenticated by providing a username and password, a biometric, etc. In one embodiment, the mobile application may be provided by, or associated with, a sponsor of access to a restricted resource, such as a restricted area or a restricted service, such as an entity that can provide free or discounted access to the restricted resource.

In step 210, the mobile application may present the user's account dashboard with the sponsoring entity. In one embodiment, the dashboard may include an option to access a restricted resource.

In step 215, the user may request access to the restricted resource using the mobile application. For example, the customer may select an access area or service icon on the dashboard.

In step 220, the mobile application may generate a code, such as an optical code, which may include a unique identifier. The code may further include a uniform resource locator (URL) to validate the code at the backend computer program.

The mobile application may then display the code on a display of the mobile electronic device, or may otherwise emit the code using sound, radio frequency communication, etc.

In step 225, the mobile application may send the unique identifier to the backend computer program. The unique identifier may be sent with an expiration time (e.g., 15 minutes, one hour, one day, etc.).

In step 230, the access device may receive the code, including the unique identifier, from the mobile electronic device. The access device may scan the code, image the code, receive the code via key entry, receive the code by RF communication, via a microphone, etc. It may then extract the unique identifier from the code, and the URL, if provided.

In step 235, the access device may send the unique identifier to backend computer program. In one embodiment, it may send the unique identifier to the URL received in the code.

In step 240, the backend computer program may determine if the unique identifier received from the area access device matches a unique identifier that is stored, and that the unique identifier has not expired or timed-out. If the unique identifier matches a received unique identifier, and has not expired, in step 245, the backend computer program may send a signal to the access device to grant access to the user. The signal may cause an access restriction device, such as a gate, a door, etc. to open or to be unlocked, or may provide access to a computer service, digital content, etc., on the mobile electronic device.

If the unique identifier does not match a received code, or if the unique identifier has expired, in step 250, the backend computer program may send a signal to the access device to deny access to the user.

The backend computer program may then log the grant of access or the denial of access to a database that may be used for auditing purposes.

In one embodiment, the backend computer program may also determine if the user is eligible for the access. For example, the backend computer program may check the user's credentials or eligibility (e.g., that the user has a membership, that the user has a certain status, that the user has not used all allocated accesses, etc.) before granting access.

Figure 3:
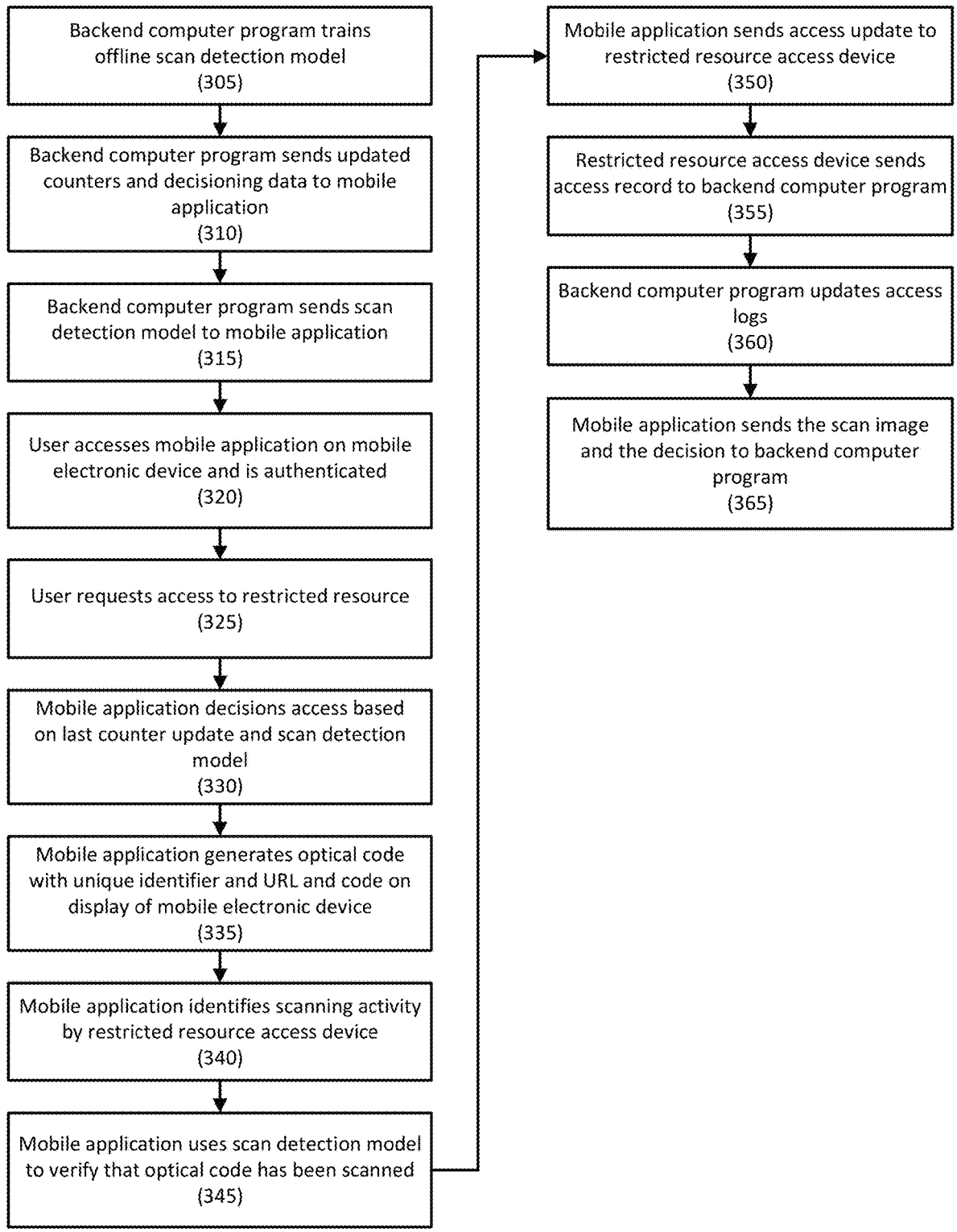
FIG. 3 depicts a method for offline restricted resource access management according to an embodiment.

FIG. 3 depicts a method for offline access management is provided according to an embodiment. In one embodiment, at least one of the user electronic device and the access device may be offline.

In step 305, a backend computer program may train an offline scan detection model using, for example, images of people and devices scanning codes, entering codes into devices, etc. In one embodiment, the images may be captured by mobile devices that are in the process of being scanned; the images may also be captured to external cameras.

In step 310, the backend computer program may send updated counters and decisioning data (e.g., the number of accesses used, the number of accesses remaining, etc.) to a mobile application executed by a user electronic device. The counters may reflect the numbers of access to the restricted resource by the user, by users associated with the sponsor, etc. In one embodiment the updated counters and decisioning data may be signed to ensure that it is valid.

In one embodiment, information about the customer may be provided so that the interaction may be more personalized.

In step 315, the backend computer program may send the trained scan detection model to the mobile application and/or the access device for the area.

In step 320, the user may access the mobile application on the mobile electronic device and may be authenticated using, for example, a username and password, a biometric, etc.

In step 325, the user may request access to the restricted resource using the mobile application. For example, the customer may select an access area or service icon presented by the mobile application.

In step 330, the mobile application may decision the access based on the last counter update and scan detection model. The decisioning may be based on, for example, the number of remaining accesses, expiration of a time period, etc.

In step 335, the mobile application may generate a code with unique identifier and URL and code on display of mobile electronic device. This may be similar to step 220, above.

In step 340, the mobile application and/or the access device may identify scanning activity by the access device. For example, the mobile application may identify a red light emitted by a bar code scanner, a camera taking an image of the screen, a position of the electronic device (e.g., being oriented so that the screen may be read by a scanner or imaged), etc.

In one embodiment, BLE or NFC may be used to detect a scanner/scan. For example, the mobile application may emit a payload that may include the unique identifier that may be signed encrypted. One or more beacons, electronic device, etc. in the area may receive the unique identifier, and may identify the location of the user to allow access. For example, the entrance to the restricted area may be configured to be a single file line, a doorway, or similar arrangement that reduces the chance of misidentifying the user.

In another embodiment, a custom Wi-Fi SSID may be used including a unique code. The Wi-Fi SSID may contain a hash of a value as its broadcast name, and this may cause the mobile device to update its internal counters. BLE may work in a similar fashion but not be as persistently available.

In still another embodiment, the user of the mobile electronic device may identify that the mobile electronic device is being presented for scanning to the mobile application.

In one embodiment, the access device may capture an image for the mobile electronic device and may use the scan detection model to determine whether the mobile electronic device is being presented for scanning. In one embodiment, images captured by additional image capture devices in the area may be received and used to determine whether the mobile electronic device is being scanned.

In step 345, the mobile application may use the scan detection model to verify that a code has been scanned or imaged. For example, the mobile electronic device may provide an image captured by the mobile device camera of the screen being scanned or imaged and may use the trained scan detection model to predict whether the mobile electronic device is being scanned.

In step 350, the mobile application may send an access update to the access device. This may indicate that the access has been granted.

In step 355, the access device may send an access record to backend computer program indicating that access was granted. In step 360, the backend computer program may then update the access log for the area and may use the access to retrain the model.

In step 365, the mobile application and/or the access device may send the scan image(s) and the decision on whether the mobile electronic device was being scanned to the backend computer program, and this may be used to further train the scan detection model.

Figure 4:
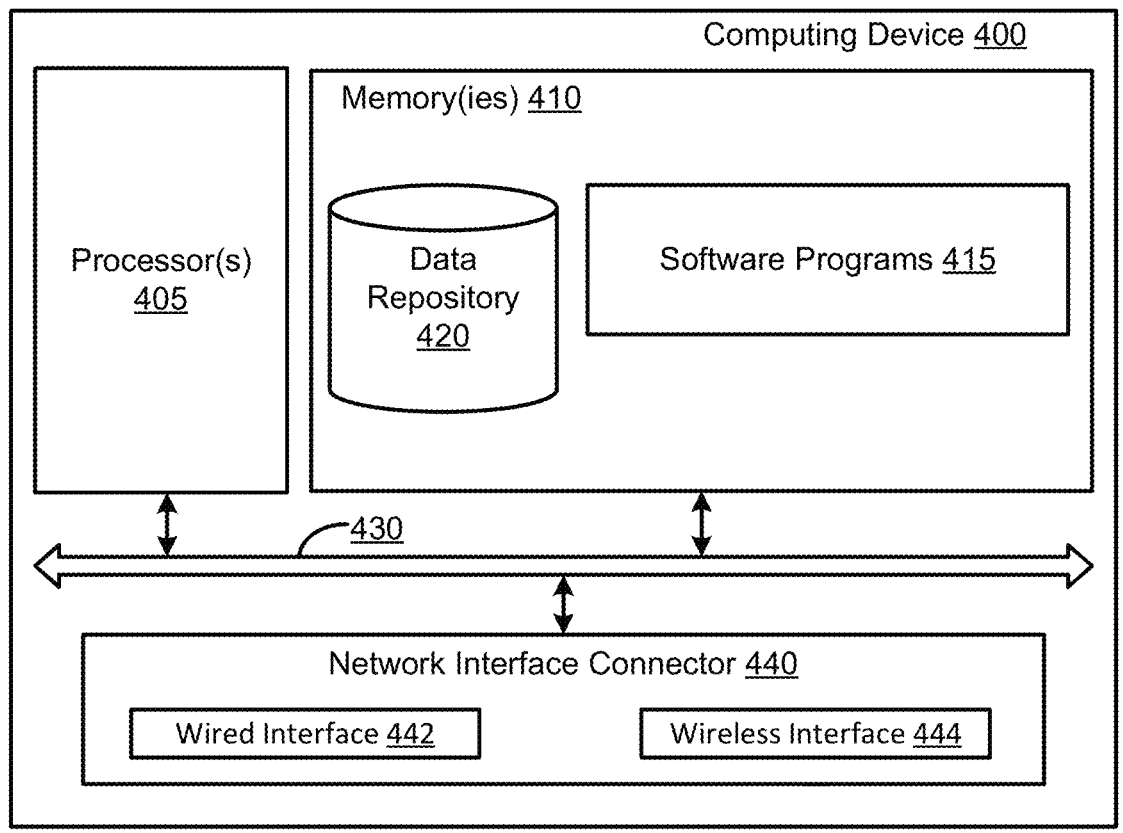
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example.

Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method comprising:
   authenticating, by a user application executed by a user electronic device, a user;
   receiving, by the user application, a request for access to a restricted resource;
   generating, by the user application, a machine-readable code comprising a unique identifier and a uniform resource locator;
   communicating, by the user application, the machine-readable code to a backend computer program;
   presenting, by the user application, the machine-readable code, to an access device for the restricted resource;
   receiving, by the access device, the machine-readable code;

communicating, by the access device, the machine-readable code to the backend computer program using the uniform resource locator;

comparing, by the backend computer program, the machine-readable code received from the user application to the machine-readable code received from the access device;

determining, by the backend computer program, that the user is eligible for the access;

sending, by the backend computer program, a first control signal to the access device to grant access in response to the machine-readable code received from the user application matching the machine-readable code received from the access device; and granting, by the access device, access to the restricted resource in response to receiving the first control signal.

2. The method of claim 1, further comprising:

sending, by the backend computer program, a second control signal to the access device to deny access in response to the machine-readable code received from the user application not matching the machine-readable code received from the access device; and denying, by the access device, access to the restricted resource in response to receiving the second control signal.

3. The method of claim 1, wherein the restricted resource comprises a physical area.

4. The method of claim 3, wherein the access device comprises an access restriction device.

5. The method of claim 4, wherein the access restriction device comprises a gate or a door.

6. The method of claim 1, wherein the restricted resource comprises digital content or a digital service, and the step of granting access to the restricted resource in response to receiving the first control signal comprises granting access to the digital content or the digital service to the user electronic device.

7. A system, comprising:

an access device associated with a restricted resource;

a user electronic device executing a user application; and a backend in communication with the user application and the user electronic device executing a backend computer program;

wherein:

the user application is configured to receive a request for access to the restricted resource from a user;

the user application is configured to generate a machine-readable code comprising a unique identifier and a uniform resource locator;

the user application is configured to communicate the machine-readable code to the backend computer program;

the user application is configured to present the machine-readable code, to an access device for the restricted resource;

the access device is configured to receive the machine-readable code;

the access device is configured to communicate the machine-readable code to the backend computer program using the uniform resource locator;

the backend computer program is configured to compare the machine-readable code received from the user application to the machine-readable code received from the access device;

the backend computer program is configured to determine that the user is eligible for the access;

the backend computer program is configured to send a first control signal to the access device to grant access in response to the machine-readable code received from the user application matching the machine-readable code received from the access device and a determination that the user is eligible for the access; and the access device is configured to grant access to the restricted resource in response to receiving the first control signal.

8. The system of claim 7, wherein the backend computer program is further configured to send a second control signal to the access device to deny access in response to the machine-readable code received from the user application not matching the machine-readable code received from the access device; and the access device is further configured to deny access to the restricted resource in response to receiving the second control signal.

9. The system of claim 7, wherein the restricted resource comprises a physical area.

10. The system of claim 9, wherein the access device comprises an access restriction device comprising a gate or a door.

11. The system of claim 9, wherein the restricted resource comprises digital content or a digital service, and the access device is further configured to grant access to the digital content or the digital service to the user electronic device.

* * * * *